US011016260B2

(12) United States Patent
Goodale et al.

(10) Patent No.: US 11,016,260 B2
(45) Date of Patent: May 25, 2021

(54) POSITIONING SYSTEM FOR COMPONENTS OF OPTICAL SYSTEMS

(71) Applicant: COGNEX CORPORATION, Natick, MA (US)

(72) Inventors: Andrew Goodale, Maynard, MA (US); Andrew Parrett, Boston, MA (US); John Filhaber, East Haddam, CT (US); Benjamin Braker, Boulder, CO (US)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 16/536,988

(22) Filed: Aug. 9, 2019

(65) Prior Publication Data
US 2020/0049923 A1 Feb. 13, 2020

Related U.S. Application Data

(60) Provisional application No. 62/716,766, filed on Aug. 9, 2018.

(51) Int. Cl.
*G01B 11/00* (2006.01)
*G02B 7/00* (2021.01)
*G01B 11/25* (2006.01)
*G02B 27/18* (2006.01)

(52) U.S. Cl.
CPC ............ *G02B 7/005* (2013.01); *G01B 11/254* (2013.01); *G02B 27/18* (2013.01)

(58) Field of Classification Search
CPC .... G01B 11/254; G01B 11/25; G01B 21/047; G02B 7/005; G02B 27/18
See application file for complete search history.

(56) References Cited

U.S. PATENT DOCUMENTS

| | | | |
|---|---|---|---|
| 4,997,158 | A | 3/1991 | James |
| 6,050,832 | A | 4/2000 | Lee et al. |
| 6,056,405 | A | 5/2000 | Heintz et al. |
| 6,239,924 | B1 | 5/2001 | Watson et al. |

(Continued)

FOREIGN PATENT DOCUMENTS

| | | |
|---|---|---|
| DE | 102012002161 A1 | 8/2013 |
| EP | 1308765 A1 | 5/2003 |
| WO | 2016149412 A1 | 9/2016 |

OTHER PUBLICATIONS

Ju, et al., ACIGA's High Optical Power Test Facility, Class. Quantum Grav., 2004, 21:S887-S893.

(Continued)

*Primary Examiner* — Zhihan Zhou
(74) *Attorney, Agent, or Firm* — Quarles & Brady LLP

(57) ABSTRACT

A positioning system for an optical system can include a support frame and a flexure arrangement. The flexure arrangement can be configured to secure an optical-system component relative to a support frame, with the optical-system component in a first orientation. The flexure arrangement can be configured to resiliently deform, upon application of a transient stress to the optical system, to move the optical-system component relative to the support frame along at least one degree of freedom. The flexure arrangement can be configured to return the optical-system component to the first orientation upon removal of the transient stress.

20 Claims, 7 Drawing Sheets

(56) References Cited

U.S. PATENT DOCUMENTS

| | | | |
|---|---|---|---|
| 6,392,688 B1 | 5/2002 | Barman et al. | |
| 6,400,516 B1 | 6/2002 | Spinali | |
| 6,650,412 B1 | 11/2003 | Slater | |
| 6,873,478 B2 | 3/2005 | Watson | |
| 6,922,293 B2 | 7/2005 | Watson et al. | |
| 7,154,684 B2 | 12/2006 | Shibazaki | |
| 7,800,852 B2 | 9/2010 | Blanding et al. | |
| 9,539,762 B2 | 1/2017 | Durand et al. | |
| 2003/0147153 A1* | 8/2003 | Hookman | G02B 7/026 359/819 |
| 2011/0310351 A1* | 12/2011 | Otsuka | H04N 9/3141 353/20 |
| 2013/0076919 A1* | 3/2013 | Gutierrez | H04N 5/23251 348/208.2 |
| 2013/0209147 A1* | 8/2013 | Ogawa | G03G 15/2053 399/329 |
| 2014/0084527 A1 | 3/2014 | Johnson et al. | |
| 2014/0205140 A1* | 7/2014 | Lovberg | G06T 7/246 382/103 |
| 2014/0320605 A1* | 10/2014 | Johnson | G01B 11/2536 348/47 |

OTHER PUBLICATIONS

Bal-tec (TM) Home Flexures, http://www.precisionballs.com/Flexures.php, 26 pages.

Bal-tec (TM) Home Flexural Encyclopedia, http://www.precisionballs.com/Flexural_Encyclopedia.php, 30 pages.

Leuze Electronic, LPS 36 HI—Light Section Sensor for Object Measurement, Product Information, 2014, http://www.leuze.com, 8 pages.

Next Intent, Vibration Isolation Flexures, Sep. 7, 2010, http://www.nextintent.com/features/275, 3 pages.

European Patent Office, Extended European Search Report, Application No. 19190851.6, dated Dec. 13, 2019, 7 pages.

\* cited by examiner

POSITIONING SYSTEM FOR COMPONENTS OF OPTICAL SYSTEMS

CROSS-REFERENCE TO RELATED APPLICATIONS

This application claims priority to U.S. Provisional Patent Application No. 62/716,766, filed on Aug. 9, 2018, the entirety of which is incorporated herein by reference.

STATEMENT REGARDING FEDERALLY SPONSORED RESEARCH OR DEVELOPMENT

Not applicable.

BACKGROUND OF THE TECHNOLOGY

The present technology relates to structural supports for optical systems, including structural arrangements for reproducibly and stably positioning a component of an optical system, such as an imaging sensor or a projection target.

Precision optical systems of various types can be useful in a variety of contexts. For example, three dimensional ("3D") imaging systems can be used in a variety of manufacturing and other settings. In some cases, machine vision systems such as 3D imaging systems can be configured to allow products to be accurately and quickly scanned for 3D information, which can be useful for shipping optimization and other tasks. However, optical systems, including 3D imaging systems with single or multiple cameras, can be difficult to deploy due to strict stability requirements and other factors. For example, accurate measurement with some systems may require a high degree of positional stability despite fluctuating environmental factors that can include changes in temperature, vibration, etc.

Environmental factors can be detrimental to the accuracy of machine vision systems in different ways. For example, in some cases thermal (or other) transients can cause components of an imaging system (e.g., imaging sensors) to shift away from a calibrated position, resulting in poor execution of processing tasks that are based on the calibrated position. Further, even when transient stresses are removed, lack of repeatability in relaxation of a system can be problematic.

Due to the precision of certain systems, shifts on the order of microns or hundreds of nanometers can significantly affect measurement accuracy. For example, some systems may have pixel sizes on the order of microns yet may be expected to perform with sub-pixel accuracy. In some instances, this can be particularly problematic with single-camera vision systems.

SUMMARY OF THE TECHNOLOGY

Some embodiments of the technology provide a positioning system for an optical system that includes an optical-system component configured as part of a projection or imaging system. The positioning system can include a support frame and a flexure arrangement configured to secure the optical-system component relative to the support frame with the optical-system component in a first orientation. The flexure arrangement can be configured to resiliently deform, upon application of a transient stress to the optical system, to move the optical-system component relative to the support frame along at least one degree of freedom. The flexure arrangement can also be configured to return the optical-system component to the first orientation upon removal of the transient stress.

In some embodiments, one or more other features can be included for the noted positioning system. The flexure arrangement can be integrally formed with the support frame. The flexure arrangement can be integrally formed with the optical-system component. The optical-system component can include a printed circuit board to support an imaging sensor. The flexure arrangement can be integrally formed with the printed circuit board.

The flexure arrangement includes a single flexure arm and a fixed constraint. The optical-system component can be secured to each of the single flexure arm and the fixed constraint with a respective threaded fastener. The optical system can define an optical axis, wherein a reference line between the fixed constraint and an attachment point of the single flexure arm to the optical-system component passes through the optical axis. The at least one degree of freedom provided by the flexure arrangement can be aligned for substantially linear translation of the optical-system component away from the fixed constraint.

The flexure arrangement can include a plurality of flexure arms. A first flexure arm of the flexure arrangement can extend from the support frame in a first direction. A second flexure arm of the flexure arrangement can extend from the support frame in a second direction that is substantially perpendicular to the first direction. A third flexure arm of the flexure arrangement can extend from the support frame in the second direction, the third flexure arm being spaced apart from the second flexure arm in the first direction. The first flexure arm can extend from a first portion of the support frame, and the second and third flexure arms can extend from a second portion of the support frame that extends substantially perpendicularly to the first portion of the support frame. The optical system can define an optical axis, wherein each of the second and third flexure arms is secured to the optical-system component at a respective attachment point, and the attachment points of the second and third flexure arms can be disposed on a first reference line that extends through the optical axis. The first flexure arm can be secured to the optical-system component at an first-flexure attachment point, and the first-flexure attachment point can be disposed on a second reference line that is substantially perpendicular to the first flexure arm and extends through the optical axis.

The flexure arms can be configured to provide degrees of freedom for translation and rotation within a focal plane of the optical system. Each of the flexure arms includes a first bending portion proximate the support frame and a second bending portion proximate a free end of the flexure arm, the first and second bending portions having a lower stiffness than adjacent portions of the respective flexure arm. Each of the first and second bending portions of each of the flexure arms can be configured as a neck on the respective flexure arm.

The optical-system component can be a first component and the optical system can include a second component, the flexure arrangement can be a first flexure arrangement, and the positioning system can further include a second flexure arrangement configured to secure the second component to the support frame in a second orientation, at a different location than the first component. The second flexure arrangement can be configured to resiliently deform, upon application of the transient stress to the optical system, to move the second component relative to the support frame along at least one degree of freedom, and the second flexure arrangement can be configured to return the second component to the second orientation upon removal of the transient stress. Each of the first and second flexure arrangements can include one of: a respective single flexure arm and a respective fixed constraint; or a respective plurality of flexure arms. The first flexure arrangement can include a plurality of flexure arms and the second flexure arrangement can include a single flexure arm and a fixed constraint.

The optical system can include a third component, and the positioning system can include a third flexure arrangement configured to secure the third component to the support frame in a third orientation, between the first and second components. The third flexure arrangement can be configured to resiliently deform, upon application of the transient stress to the optical system, to move the third component relative to the support frame along at least one degree of freedom. The third flexure arrangement can be configured to return the third component to the third orientation upon removal of the transient stress.

The first component can be a projection system, the second component can be a first imaging system, and the third component can be a second imaging system, wherein the first flexure arrangement includes a plurality of flexure arms. Each of the second and third flexure arrangements can include, respectively, a single flexure arm and a fixed constraint. The flexure arrangement can be secured to the optical-system component with an adhesive.

Some embodiments of the technology provide an optical system that can include a support frame, an optical component, and a flexure arrangement that secures the optical component to the support frame with the optical component in a first orientation. The flexure arrangement can be configured to resiliently deform relative to at least one degree of freedom, upon application of a transient stress to the optical system, to move the optical component relative to the support frame. The flexure arrangement can also be configured to return the optical component to the first orientation upon removal of the transient stress.

In some embodiments, one or more other features can be included for the noted optical system. The flexure arrangement can be integrally formed with one of the support frame or the optical component. The optical component can include a printed circuit board to support an imaging sensor. The flexure arrangement is integrally formed with the printed circuit board. The flexure arrangement can include a single flexure arm and a fixed constraint.

The optical system can further include a lens arrangement that defines an optical axis, wherein a reference line between the fixed constraint and an attachment point of the single flexure arm to the optical component passes through the optical axis. At least one degree of freedom provided by the flexure arrangement can be aligned for substantially linear translation of the optical component away from the fixed constraint.

The flexure arrangement includes a plurality of flexure arms. A first flexure arm of the flexure arrangement can extend from the support frame in a first direction, and a second flexure arm of the flexure arrangement can extend from the support frame in a second direction that is substantially perpendicular to the first direction. A third flexure arm of the flexure arrangement can extend from the support frame in the second direction, the third flexure arm being spaced apart from the second flexure arm in the first direction. The first flexure arm can extend from a first portion of the support frame, and the second and third flexure arms can extend from a second portion of the support frame that extends substantially perpendicularly to the first portion of the support frame.

The optical system can further include a lens arrangement that defines an optical axis. Each of a first flexure arm and a second flexure arm of the plurality of flexure arms can be secured to the optical component at a respective attachment point, and the attachment points of the first and second flexure arms can be disposed on a first reference line that extends through the optical axis. An attachment point at which a third flexure arm of the plurality of flexure arms is secured to the optical component can be disposed on a second reference line that is substantially perpendicular to the first reference line and extends through the optical axis.

The flexure arms can be configured to provide at least two degrees of freedom for movement within a focal plane of the optical system. Each of the flexure arms can include a first bending portion and a second bending portion, the first and second bending portions having a lower stiffness than adjacent portions of the respective flexure arm. For each of the flexure arms, the first bending portion can be configured as a first neck proximate the support frame and the second bending portion can be configured as a second neck proximate a free end of the flexure arm.

The optical component can be a first optical component and the flexure arrangement can be a first flexure arrangement, and the optical system can further include a second optical component and a second flexure arrangement that secures the second optical component to the support frame at a different location than the first optical component, with the second optical component in a second orientation. The second flexure arrangement can be configured to resiliently deform, upon application of the transient stress to the optical system, to move the second optical component relative to the support frame along at least one degree of freedom. The second flexure arrangement can be configured to return the second optical component to the second orientation upon removal of the transient stress.

Each of the first and second flexure arrangements can include a respective one of: a respective single flexure arm and a respective fixed constraint; or a respective plurality of flexure arms. The first flexure arrangement can include a plurality of flexure arms and the second flexure arrangement can include a single flexure arm and a fixed constraint.

The optical system can include a third optical component and a third flexure arrangement that secures the third optical component to the support frame between the first and second optical components, with the third optical component in a third orientation. The third flexure arrangement can be configured to resiliently deform, upon application of the transient stress to the optical system, to move the third optical component relative to the support frame along at least one degree of freedom. The third flexure arrangement can be configured to return the third optical component to the third orientation upon removal of the transient stress. The first optical component can be a projection system, the second optical component can be a first imaging system, and the third optical component can be a second imaging system. The first flexure arrangement can include a plurality of flexure arms and each of the second and third flexure arrangements can include, respectively, a single flexure arm and a fixed constraint. The first and third optical components can be calibrated for cooperative use, in the first and third orientations, respectively, in a three-dimensional dimensioning system.

Some embodiments of the technology provide a positioning system for a three-dimensional (3D) measurement system that includes a projection system with a projection target and a projector that defines a projector focal plane, and an imaging system with an imaging sensor and a lens arrangement that defines an imaging focal plane, the imaging system being configured to interoperate with the projection system to execute 3D measurements. The positioning system can include a support frame, a first flexure arrangement, and a second flexure arrangement. The first flexure arrangement can be configured to secure the projection target relative to the support frame, the first flexure arrangement including a plurality of flexures that permit two-dimensional (2D) movement of the projection target within the projector focal plane and that prevent movement of the projection target out of the projector focal plane, in response to transient stresses on the 3D measurement system. The second flexure arrangement can be spaced apart from the first flexure arrangement along the support frame, and can include a fixed constraint and a single flexure arm that direct movement of the imaging sensor substantially along a single movement dimension within the imaging focal plane and that prevent movement of the imaging sensor out of the imaging focal plane, in response to transient stresses on the 3D measurement system.

In some embodiments, one or more other features can be included for the noted positioning system for a 3D measurement system. At least one of the first flexure arrangement or the single flexure arm can be integrally formed with the support frame. The imaging system can be spaced apart from the projection target in a first direction and with optical axes of the projection system and the imaging system being obliquely oriented relative to each other, wherein the single movement dimension is substantially perpendicular to the first direction.

One or more of the flexures of the first flexure arrangement can be rigidly and non-rotatably secured to projection target. The one or more of the flexures can be secured to the projection target with adhesive. The one or more of the flexures can be rigidly and non-rotatably secured to a glass substrate of the projection target. The imaging sensor can be secured with threaded fasteners to the single flexure arm and at the fixed constraint.

The imaging system can define an optical axis, and a reference line, between the fixed constraint and an attachment point of the single flexure arm to the imaging sensor, can pass through the optical axis. The reference line can coincide with the single movement dimension.

The first flexure arrangement can include: a first flexure arm of the first flexure arrangement that extends from the support frame in a first direction; and a second flexure arm of the first flexure arrangement that extends from the support frame in a second direction that is substantially perpendicular to the first direction. A third flexure arm of the first flexure arrangement can extend from the support frame in the second direction, the third flexure arm being spaced apart from the second flexure arm in the first direction. The first flexure arm can extend from a first portion of the support frame, and the second and third flexure arms can extend from a second portion of the support frame that extends substantially perpendicularly to the first portion of the support frame. Each of the flexures of the first flexure arrangement can include a notch that provides a locating feature for the projection target.

The projection system can define an optical axis, and each of at least two flexure arms of the plurality of flexures of the first flexure arrangement can be secured to the projection target at a respective attachment point. Each of the attachment points can be disposed on a first reference line that extends perpendicularly to the optical axis within the projector focal plane. An additional flexure arm included in the plurality of flexures of the first flexure arrangement can be secured to the projection target at an attachment point that is disposed on a second reference line that is substantially perpendicular to the first reference line and extends through the optical axis within the projector focal plane. At least one of the first reference line or the second reference line can be a centerline of the projection target.

The imaging system can be a first imaging system, the 3D measurement system can further include a second imaging system with a second imaging sensor and a second lens arrangement that defines a second imaging focal plane, and the positioning system can further include a third flexure arrangement, disposed between the first and second flexure arrangements along the support frame. The third flexure arrangement can include a second fixed constraint and a second single flexure arm that direct movement of the second imaging sensor substantially along a second single movement dimension within the imaging focal plane and that prevent movement of the second imaging sensor out of the second imaging focal plane, in response to transient stresses on the 3D measurement system.

Some embodiments of the technology can provide a positioning system for an optical system that includes an optical-system component that forms part of a projection or imaging system. The positioning system can include a support frame and a flexure arrangement configured to secure the optical-system component relative to the support frame with the optical-system component in a first orientation, to resiliently deform, upon application of a transient stress to the optical system, to move the optical-system component relative to the support frame along at least one degree of freedom, and to return the optical-system component to the first orientation upon removal of the transient stress. The flexure arrangement can include first and second flexure arms extending in parallel with each other, from respective first and second anchor points at the support frame to respective first and second attachment points at the optical-system component. A third flexure arm can extend perpendicularly to the first and second flexure arms, from a third anchor point at the support frame to a third attachment point at the optical-system component. The first and second attachment points can be aligned on a first centerline of the optical-system component. The third attachment point can be aligned on a second centerline of the optical-system component.

In some embodiments, one or more additional features can be included for the note positioning system. The first and second centerlines can intersect at an optical axis of the optical system. The first, second, and third flexure arms can be rigidly and non-rotatably secured to the optical-system component.

Some embodiments of the technology can provide a positioning system for an optical system that includes an optical-system component that forms part of a projection or imaging system. The positioning system can include a support frame and a flexure arrangement. The flexure arrangement can be configured to secure the optical-system component relative to the support frame with the optical-system component in a first orientation, to resiliently deform, upon application of a transient stress to the optical system, to move the optical-system component relative to the support frame along at least one degree of freedom, and to return the optical-system component to the first orientation upon removal of the transient stress. The flexure arrangement can include: a single flexure arm secured to the optical-system component at a first attachment point; and a single rigid constraint that secures the optical-system component to the support frame. A reference line that extends between the first attachment point and the single rigid constraint extends through an optical axis of the optical system.

DETAILED DESCRIPTION OF THE TECHNOLOGY

Figure 1:
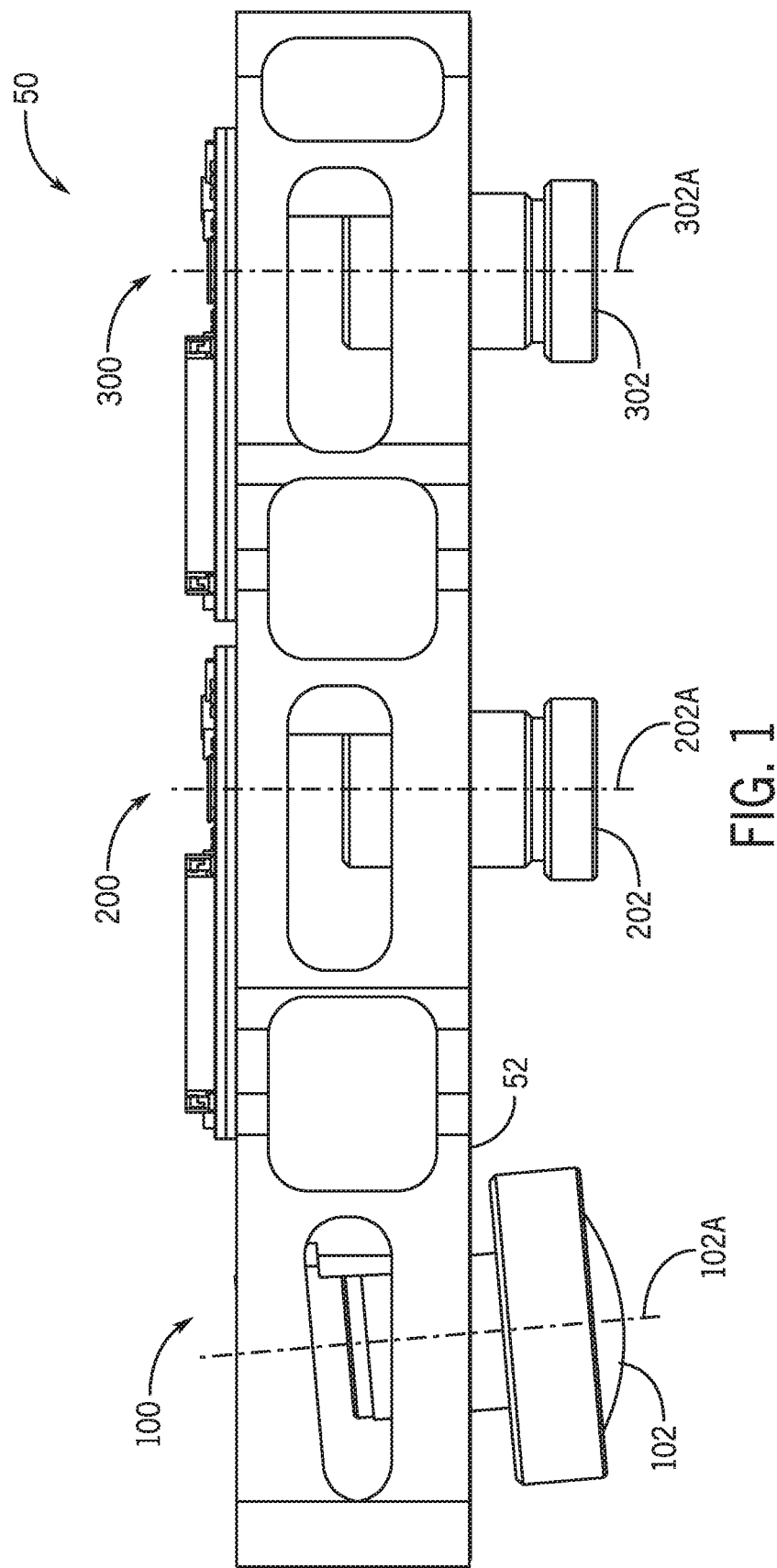
FIG. 1 shows a front elevation view of an optical system, according to one embodiment of the technology.

In the following detailed description, reference is made to the accompanying drawings that form a part hereof. In the drawings, similar symbols typically identify similar components, unless context dictates otherwise. The example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

As used herein, unless otherwise specified or limited otherwise, the terms "mounted," "connected," "supported," and "coupled" and variations thereof are used broadly and encompass both direct and indirect mountings, connections, supports, and couplings. Likewise, "connected" and "coupled" are not restricted to physical or mechanical connections or couplings.

Also as used herein, unless otherwise specified or limited, a "fixed constraint" refers to a mechanical connection between two objects that substantially constrains relative movement of the objects along all degrees of freedom.

As also noted above, improved control of the orientation of components of optical systems, including 3D imaging systems, can contribute to improved accuracy in imaging and associated operations, including calculation of 3D measurements. Accordingly, some conventional approaches attempt to secure sensors relatively rigidly. For example, some conventional approaches use threaded fasteners (e.g., screws) to attach imaging components, such as sensors, printed circuit boards ("PCBs"), or other substrates, to rigid structural supports. While this approach can be useful in some implementations, it can sometimes result in substantial errors. For example, use of multiple fixed constraints can sometimes over-constrain the relevant components, which can lead to irreversible buckling or other deformation. Further, upon application of transient stresses, the components can slip or otherwise displace relative to the support structure, including at the fasteners. Further, hysteresis during return of the overall system, once the transient stresses have been removed, can result in persistent errors in the location of the sensors and associated deficiencies in measurement (or other) operations.

Embodiments of the technology can address the issues above, or others, in various ways. For example, in some embodiments, one or more flexure arms can be disposed to support a PCB or other substrate relative to components of a larger optical system. As stresses are applied to the optical system, such as by thermal transients or other transient stresses, the flexure arm(s) can allow the PCB or other substrate to move from a starting (e.g., calibrated) orientation to a second, loaded orientation. Usefully, in some arrangements, the movement to the second, loaded orientation can proceed along particular degrees of freedom in a predictable and repeatable way, due to the configuration of the flexure arm(s) and the associated connection(s) to the PCB or other substrate. Further, in some arrangements, when the transient stresses have been removed, the flexure arm(s) can cause the PCB or other substrate to repeatably and reliably return to the starting calibrated position.

In some configurations, embodiments of the technology can be used in 3D dimensioning systems, such as stereo-imaging or structured-light 3D systems. In some embodiments, for example, flexure arrangements can be used with imaging systems of a number, N, of imaging sensors that are arranged to cooperatively perform measurements along 2*N dimensions of the same object or phenomena. For example, in some embodiments, at least two imaging devices with associated imaging sensors can be arranged in a stereo configuration to measure 3D aspects of a target along two dimensions of imaging sensors. As another example, in some embodiments, an optical system can include a calibrated structured-light system to measure 3D aspects of a target, with a two-dimensional ("2D") pattern projector and an associated 2D imaging device. In some embodiments, these imaging sensors and components of such structure-light systems can be supported by flexure arrangements, including as expressly detailed below.

In some embodiments, such as in a structured light 3D system (e.g., as described above), an optical system can measure 3D aspects of an object or space by measuring one dimension on an imaging sensor and two dimensions on a projected pattern. As such, a second dimension on the imaging sensor may be left as a largely unused fourth dimension of measurement. In some embodiments, a flexure arrangement can be configured to appropriately support and constrain such a system, to allow for predictable translation of the imaging sensor, under transient stresses, along one dimension in particular—e.g., the unused fourth dimension. In this way, for example, because movement of the imaging sensor under transient stresses can be channeled to occur primarily along a less critical (e.g., unused) dimension, the movement may result in relatively small overall imaging error. In some embodiments, similar configurations can also be implemented for stereo-imaging systems or for other optical systems.

In some embodiments, an optical system can include one or more separate imaging or projection systems, one or more of which can be supported by a flexure arrangement. In some embodiments, an imaging sensor can be configured to capture imaging information, or a projection system can be configured to project structured light patterns, on, at, or near an optical axis determined by an associated lens arrangement. In some embodiments, the relevant optical axis can be perpendicular to a surface of the projector or of the camera.

In some embodiments, an optical system can include hardware and software configured to assist in capturing and processing imaging information. For example, a processor device such as a special or general purpose a field programmable gate array, or other similar device, and an associated memory and input/output architecture; can be configured to control projection of structure light patterns, capture of appropriate images, or analysis of acquired images using machine vision algorithms. Operation of such a processor device can be calibrated, for example, based on predictable expected movement of relevant imaging components (e.g., sensors or projectors) as controlled by appropriate flexure arrangements.

In some embodiments, an optical system can include a focal plane, a location of which is determined by a lens arrangement and associated mechanical components (e.g., a monolithic or other frame). In some embodiments, an imaging sensor or a projection target, such as a chrome-on-glass slide can be configured to be aligned with an associated focal plan in a calibrated orientation. In some embodiments, an imaging sensor or a projection target can be flush with the focal plane in the calibrated orientation. In some embodiments, a surface of an imaging sensor or projection target can be parallel to an associated focal plane and perpendicular to an associated optical axis.

In some embodiments, a component for imaging or projection, such as a projection target or a PCB assembly configured for image capture (and, in some cases, image analysis), can be secured to a frame of an optical imaging system by one or more constraints, at least one of which is configured as a flexure. In some embodiments, at least one of the constraints can be configured as a fixed constraint. For example, a first side of a PCB can be secured to a frame using an elongate flexure arm and a second side of the PCB can be secured to a frame at a fixed mounting point. In some configurations, mechanical fasteners, such as counter-sunk screws, can be used to secure the component to the flexure or to the fixed constraint. Such an arrangement can be useful, for example, in order to cause the relevant optical component to move predictably, under a variety of transient stresses, mainly along a single direction. In some embodiments, as also noted above, the flexure arrangement can be configured to cause the optical component to move primarily along only an unused direction, relative to relevant imaging operations.

In some embodiments, a flexure arrangement can be formed from the same material as the component to be secured. For example, one or more flexure arms can be integrally formed with a PCB that supports an imaging sensor, or with another relevant component. This may be useful, for example, to allow the flexure arrangement and the PCB to have identical or near identical material properties, such as the same thermal expansion coefficient. Accordingly, for example; the PCB and the flexure arms can be expected to expand and retract in a relatively predictable and similar manner.

In some embodiments, as also noted above, a relevant component, such as an imaging sensor, can be secured at a first side with a flexure and can be secured at a second side with a fixed constraint. In some embodiments, a relevant component can be secured with a flexure arrangement that includes multiple flexures. For example; a PCB with an imaging sensor or a glass slide with a chrome projection pattern can be secured using a set of three flexure arms, collectively configured to provide appropriate constraint (and freedom of movement) of the PCB or the slide.

In some embodiments, a flexure arm can individually constrain movement relative to certain degrees of freedom, while providing relatively little resistance to movement relative to other degrees of freedom. For example, a flexure arm can be configured to allow movement of a component within a particular plane (e.g., a plane corresponding to a relevant focal plane), but substantially constrain translation or rotation along or about an axis perpendicular to the plane (e.g., a relevant optical axis). In some embodiments, a flexure arm can be configured to allow movement over two degrees of freedom within a particular plane, such as a rotational degree of freedom and a substantially translational degree of freedom.

Some embodiments of the technology can usefully allow a component, such as an imaging sensor or a projection target, to predictably move upon application of an external stress on the component or on a larger optical system. Further, once the external stress has been removed, the relevant flexure arrangement can allow the component to predictably and reproducibly return to its original position, before the stress was applied to the system. Accordingly, despite transient disturbances, calibrated alignment of particular components can be reliably preserved for general operation. In different applications, external stresses applied to an optical system can include, for example: thermal gradients, thermal cycling, mechanical vibrations, and changes in gravitational forces induced by changes in the orientation of the imaging system.

In some embodiments, a component can be secured to a relevant frame by a flexure arrangement with three mechanical links. For example, a PCB of an imaging device or a projection target can be secured to a larger frame, in a calibrated alignment with a relevant focal plane, using a set of three elongate flexure arms. In some embodiments, three flexure arms can be integrally formed with a frame of an optical system and can be secured to a component with adhesives, or otherwise, to restrain the component within a relevant focal plane. In some embodiments, the three flexure arms can be integrally formed as part of a component that is to be secured relative to a larger optical system. For example, a set of flexure arms can be integrally, formed with a PCB that supports an imaging sensor within a focal plane.

In some embodiments, a flexure arrangement with three flexures, such as three flexure arms, can provide reproducible positioning of a component, including relative to a relevant focal plane. For example, each flexure arm can individually restrict movement in certain respective degrees of freedom, while individually providing little resistance to movement in other degrees of freedom. In some embodiments, for example, upon on loading of the flexures by the stresses to the system a component can thereby predictably move from a first calibrated orientation to a second orientation. Further, once the stresses have been removed, the flexures can elastically, predictably, and reproducibly return to the first calibrated position. In some embodiments, fewer than three flexures can be used to similar effect.

In some embodiments, a positioning system can be configured to provide reproducible movement of a component over a particular temperature range. For example, some embodiments can include a flexure arrangement configured to provide reproducible positioning and stabilizing of system components, such as an imaging sensor, over an expected operating temperature range of the imaging sensor. Thus, for example, measurement accuracy can be provided over the entire temperature range.

FIG. 1 illustrates an example optical system 50 according to one embodiment of the technology. In the embodiment illustrated, the optical system 50 is configured as a 3D measurement system. In some embodiments, as also discussed above, a 3D measurement system can include a plurality of imaging systems or other optical systems, such as projection systems, that are separated from each other by a precise, calibrated distance and are configured to interoperate to allow execution of 3D measurement procedures.

In some arrangements, a plurality of optical devices can include two imaging devices that are configured to separately image a common target. The separate images can then be analyzed in concert to identify 3D aspects (e.g., bulk or local dimensions) of the target. In some arrangements, the plurality of optical devices can include a projector to project light onto a target and an imaging device to acquire images of the target and the projected light. The acquired image can then be analyzed, in view of known qualities of the projected light, to identify 3D aspects of the target. In other embodiments, other configurations are possible.

In the embodiment illustrated in FIG. 1, the optical system 50 includes a support frame that is configured as a unitary optical beam 52. Further, a projection system 100, an imaging system 200, and an imaging system 300 are collectively and individually supported by the optical beam. In different embodiments, different optical systems can be used. In the illustrated example in particular, the projection system 100 includes a first lens arrangement 102, the imaging system 200 includes a second lens arrangement 202, and the imaging system 300 includes a third lens arrangement 302. The first lens arrangement 102, the second lens arrangement 202, and the third lens arrangement 302 generally include one or more lenses or other optical components that are configured to focus or disperse light. In some embodiments, for example, the lens arrangements 102, 202, 302 can include a zoom lens in order to change the focal point of an imaging field, or one or more shutters configured to efficiently capture an image of an imaging field.

In some embodiments, one or more of the multiple lens arrangements in a larger assembly can be configured to define a focal plane that is slightly out of plane relative to a support plane defined by defined a support frame of the system, or other geometrical reference plane. For example, in the embodiment illustrated, as arranged for 3D dimensioning operations, the first lens arrangement 102 and the third lens arrangement 302 are tilted slightly towards each other, so that optical axes 102a, 302a of the lens arrangements 102, 302 intersect in an imaging field (not shown). Accordingly, the relative angle between the optical axes 102a, 302a and a lateral separation between the lens arrangements 102, 302 (or associated components of the projection system 100 and the imaging system 300) can be used to determine 3D information about an imaged object or space.

In some embodiments, the projection system 100 can include a projector, the imaging system 200 can include a color based camera system, and the imaging system 300 can include a grayscale based camera. In this regard, for example, the projection system 100 and the imaging system 300 can be used cooperatively to determine 3D information about an imaged object or space, and to thereby produce a grayscale 3D image based on the 3D information. Data from images acquired by the imaging system 200, can then be used to overlay color, texture, or other information over the grayscale 3D image.

Figure 2:
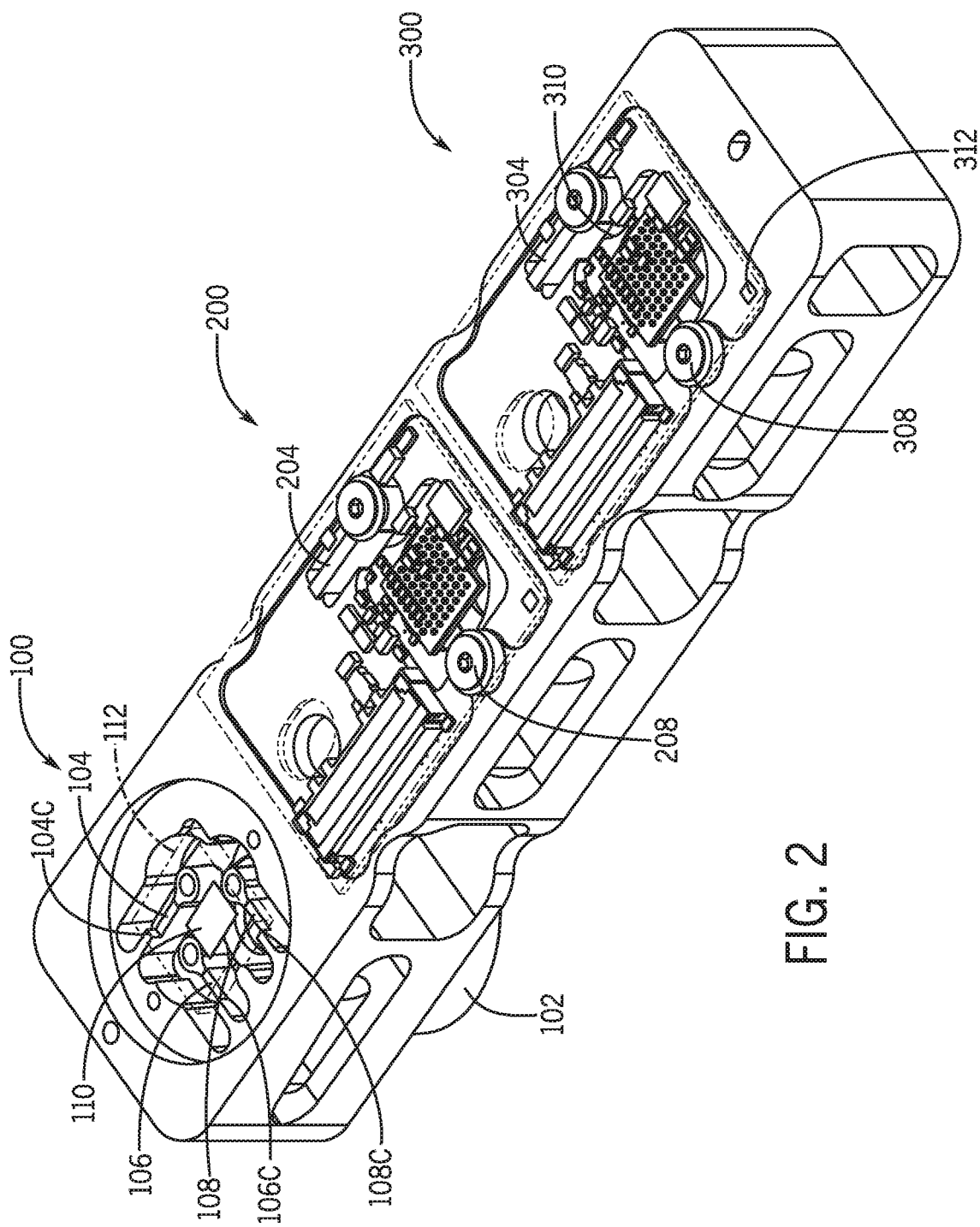
FIG. 2 shows an isometric view of the optical system of FIG. 1, with certain components rendered transparently.
Figure 3:
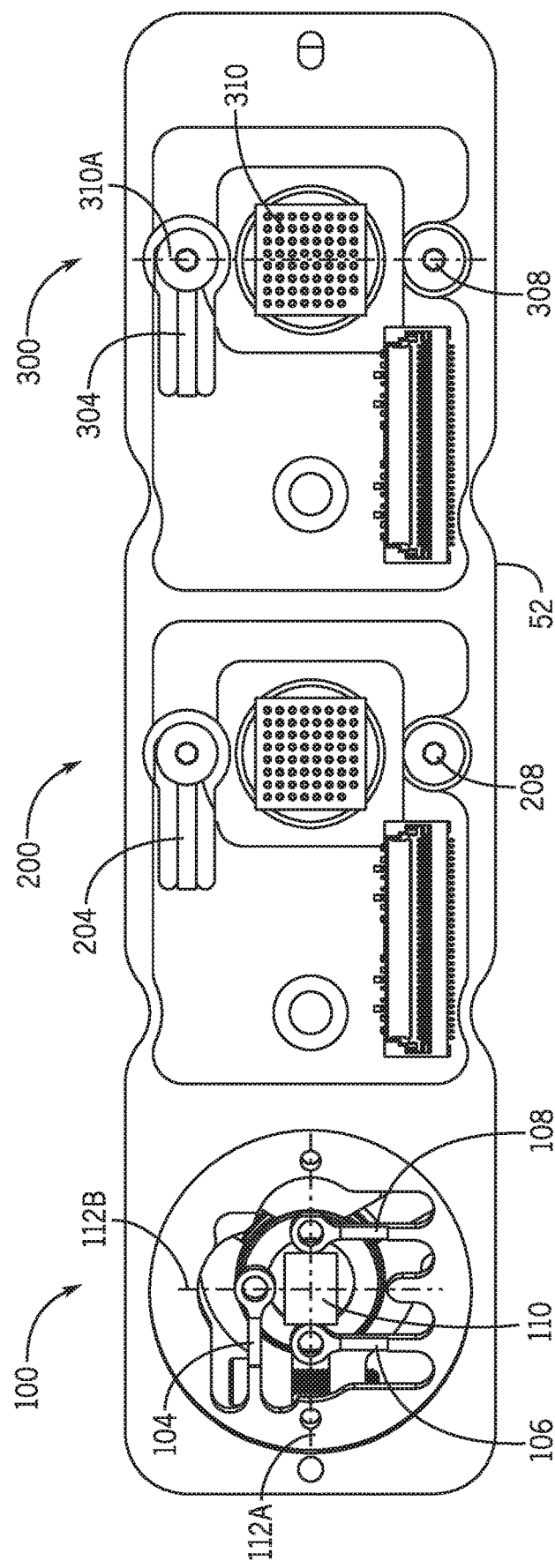
FIG. 3 shows a top plan view of the optical system of FIG. 1, with certain components removed.
Figure 4:
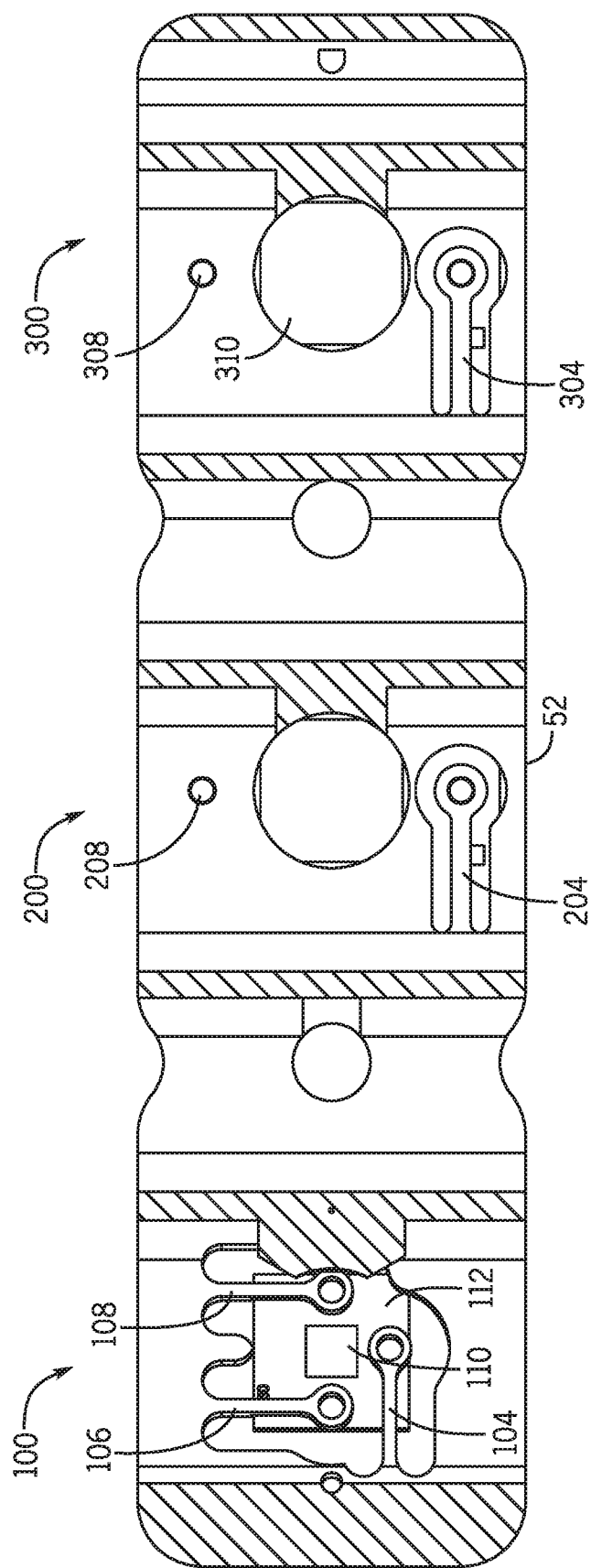
FIG. 4 shows a bottom cross-sectional view of the optical system of FIG. 1.

FIG. 2 through 4 show additional views of the optical system 50, illustrating certain internal and external components thereof, according to the illustrated embodiment of the technology. In FIG. 2, certain components of the optical system 50 are illustrated transparently to illustrate relative arrangement of those components relative to others. In FIG. 3, certain aspects of the projection system 100 have been hidden from view to more clearly show other aspects of the projection system 100, including the orientation of a projection target (as also discussed below) relative to three flexure arms, and the orientation of imaging sensors of the imaging systems 200, 300 relative to respective flexure arrangements that include respective single flexure arms and fixed constraints (as also discussed below).

Figure 5:
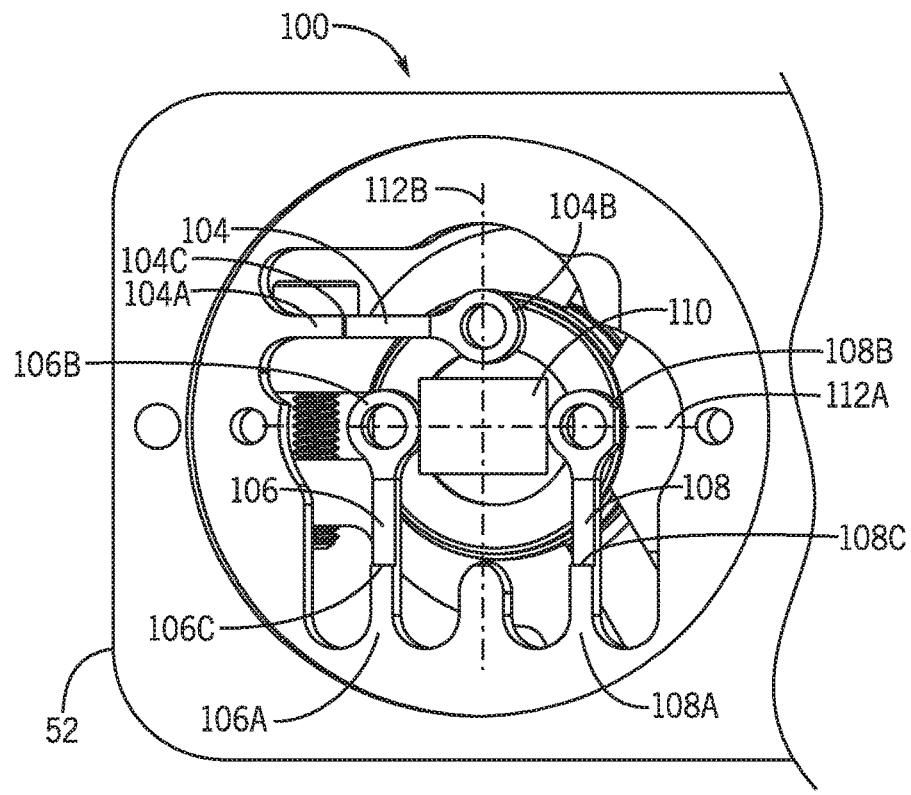
FIG. 5 shows an enlarged top plan partial view of a projection system of the optical system of FIG. 1.

In particular, FIG. 5 illustrates an enlarged top plan partial view of aspects of the projection system 100. In the embodiment illustrated, the projection system 100 is configured to project a light pattern onto a target (not shown). Correspondingly, the projection system 100 generally includes an illumination device (not shown), such as a digital light processing ("DLP") device, a liquid crystal on silicon ("LCOS") device, a liquid crystal display ("LCD"), device, or another type of projection device, that is configured to emit light to be projected onto a target. As illustrated in FIG. 5 in particular (see also FIG. 2), the projection system 100 further includes a projection target 110, which is mounted on a substrate 112 (see FIG. 2) such as a transparent glass slide. The projection target 110 is generally configured for use with the lens arrangement 102 (see FIG. 2.) and the illumination device (not shown) to project a structured pattern of light onto a target.

To ensure accurate operation, the projection system 100 can be calibrated before operational use, including with regard to alignment of projection target 110 with the lens arrangement 102. Appropriately alignment of the projection target 110 and the lens arrangement 102, as also discussed above, can be important to reliable determination of 3D information from captured images. Likewise, to ensure reliable measurements using the projection system 100, it may be important to ensure that the projection system 100 responds predictably to imposition and removal of a variety of transient stresses. Correspondingly, it may be useful to secure the projection target 110 relative to the frame so that the projection target 110 reliably returns to a calibrated orientation despite application of different types of transient stresses. Among other approaches contemplated herein, the flexure arrangement illustrated in FIG. 5 can provide these, and other, benefits.

In the embodiment illustrated, for example, the projection target 110 is secured to the frame of the optical system 50 by way of the attachment of flexure arms 104, 106, 108 to the substrate 112. As illustrated, the flexure arms 104, 106, 108 are configured to constrain the substrate 112 (and the target 110) to movement within a focal plane defined by the lens arrangement 102 (see FIG. 2), and to repeatably return the substrate 112 to a home orientation in the absence of transient stresses. In this way, for example, any transient stresses on the larger optical system can be channeled, by the flexure arms 104, 106, 108, into permitted movement of the substrate 112 only within the focal plane of the lens arrangement 102 (i.e., as roughly corresponds to the anchor points at the free ends of the flexure arms 104, 106, 108), with movement of the substrate 112 out of the focal plane being substantially prevented.

Accordingly, although transient stresses may sometimes unavoidably result in movement of the substrate 112, the substrate itself can be maintained in an appropriate orientation to ensure accurate continue operation of imaging operations (e.g., for dimensioning) that rely on the projection system 100. In some arrangements, this may usefully allow for reliable measurement of imaged objects along two dimensions of a pattern that is projected by the projection system 100, in combination with measurement along a single dimension of an associated imaging device (e.g., within the imaging system 300, as also discussed below). Thus, because the flexure arms 104, 106, 108 help to ensure that the projection target 110 remains within the focal plane of the projection system 100, despite transient stresses, highly accurate 3D measurements of the imaged objects can be obtained.

In the embodiment illustrated, the flexure arms 104, 106, 108 are integrally formed from the frame of the optical system 50, although other configurations are possible. For example, the flexure arms in some embodiments may be integrally formed from a substrate of a relevant optical system. A variety of individual structural designs for flexure arms are also available. As illustrated in FIGS. 3 and 4 in particular, for example, each of the flexure arms 104, 106, 108 exhibits a substantially identical, constant cross-sectional profile through the frame, so that each of the flexure arms 104, 106, 108 may tend to respond similarly to similar relative stresses. In other embodiments, other configurations are possible.

Generally, a set of flexure arms can be configured in a variety of ways to allow and to constrain movement relative to particular degrees of freedom. In the embodiment illustrated, for example, the flexure arm 104 extends from an anchored end 104*a* at a first portion of the frame along an elongate direction of the frame. In contrast, the flexure arms 106, 108 extend from anchored ends 106*a*, 108*a* at a second portion of the frame that is substantially perpendicular to the first portion of the frame. The flexure arms 106, 108 are spaced apart from each other, but generally extend in a common (i.e., substantially parallel) direction that is substantially perpendicular to the flexure arm 104. The flexure arms 104, 106, 108 can this vary from some conventional flexure arrangements in which each flexure arm extends from a distinct portion of a relevant support frame, and extends in a unique, respective direction from the support frame (e.g., an optical beam) to the supported component (e.g., an imaging sensor or projection target). The approach embodied in the flexure arms 104, 106, 108 can improve manufacturability and reduce production costs, while still providing substantial stability for imaging (and projection) operations.

In some embodiments, flexure arms can be configured to optimize a balance between stability and structural restraint, or various other considerations. For example, it may be useful to dispose attachment points of flexures close to relevant centerlines of an optical component (e.g., the projection target 110) to minimize or otherwise control deflection of the component for a given transient stress or relative to a particular degree of freedom. It may also be useful to disperse attachment points of the flexures over a relatively large area, in order to provide a high degree of stability. In this regard, for example, as illustrated in FIG. 5 in particular, an attachment point 104*b* of the flexure arm 104, and attachment points 106*b*, 108*b* of the flexure arms 106, 108 are disposed in alignment with an associated one of centerlines 112*a*, 112*b* of the substrate 112 and the projection target 110 (see FIGS. 3 and 5), while also being spaced over a relatively large area. Further, the centerline 112*a* (or other reference line between flexure attachments) can be aligned perpendicularly to the optical axis 102*a* within the projector focal plane, as well as perpendicular to the centerline 112*b*. This configuration, for example, may usefully reduce (or otherwise control) deflection of a reference point on the projection target 110 relative to the optical axis of the lens arrangement 102, while also providing a relatively high degree of stability. In other embodiments, however, other configurations are possible.

In different embodiments, a flexure arrangement can be secured to a relevant component in different ways. For the illustrated embodiment of the projection system 100, for example, each of the attachment points 104*b*, 106*b*, 108*b* of the flexure arms 104, 106, 108 includes a circular aperture positioned at a free end of the respective flexure arm 104, 106, 108, opposite the respective portions of the frame to which the flexure arms 104, 106, 108 are attached (i.e., the anchored ends 104*a*, 106*a*, 108*a*), and in alignment with the associated centerline (as also discussed above). An adhesive material can be placed within these apertures in order to assist in firmly securing the substrate 112 (and the projection target 110) to the flexure arms 104, 106, 108. In some arrangements, this use of adhesive can allow for an appropriately secure rigid and non-rotatable attachment of glass (or other materials) so that there is substantially no slip between the flexure arms 104, 106, 108 and the substrate 112 (e.g. so that the a fixed constraint is provided between the attachment points 104*b*, 106*b*, 108*b* and the substrate 112). Similarly, because the anchored ends 104*a*, 106*a*, 108*a* are integrally formed with the surrounding structures of the optical beam 52, there may be no slip between the flexure arms 104, 106, 108 and the optical beam 52. In other embodiments, however, other configurations are possible. Thus, in contrast to conventional solutions that employ threaded fasteners, the flexure arms 104, 106, 108 can be economically used with glass optical-system components while still providing appropriate movement control.

In the embodiment illustrated, the first flexure arm 104, the second flexure arm 106, and the third flexure arm 108 can individually constrain movement relative to certain respective degrees of freedom, while individually providing relatively little resistance to movement relative to other degrees of freedom. For example, the first flexure arm 104 can bend relatively easily within a plane defined by a surface on the focal plane (or projection target 110), along a generally arcuate path relative to the anchored end 104*a* of the flexure arm 104. However, movement out of the focal plane (e.g., into or out of the page in FIG. 5) as well as movement in parallel with the elongate direction of flexure arm 104 may be substantially restricted. Further, in some embodiments, the scale of relevant movements, as compared to the elongate length of the flexure arm 104, may result in the noted arcuate movement being substantially linear. Thus, for example, the flexure arm 104 can effectively allow movement of the substrate 112 essentially linearly along the centerline 112*b*.

With regard to deflection, in the embodiment illustrated, the second flexure arm 106 and the third flexure arm 108 function similarly to the first flexure arm 104. In particular, movement within the focal plane along respective arcuate paths may be generally allowed, while movement out of the focal plane may be substantially constrained. In particular, in the illustrated embodiment, the flexure arms 106, 108 can bend relatively easily within a plane defined by a surface on the focal plane (or projection target 110), along a generally arcuate path relative to the anchored end 106*a*, 108*a* of the flexure arms 106, 108. However, movement out of the focal plane (e.g., into or out of the page in FIG. as well as movement in parallel with the elongate direction of flexure arms 106, 108 may be substantially restricted. Further, in some embodiments, the scale of relevant movements, as compared to the elongate length of the flexure arms 106, 108, may result in the noted arcuate movement being substantially linear. Thus, for example, the flexure arms 106, 108 can effectively allow local movement of the substrate 112 essentially linearly along the centerline 112a. Further, despite extending in a common direction, the lateral spacing of the flexure arms 106, 108 apart from each other along the direction of the centerline 112a can allow the noted movement without detrimentally over-constraining the substrate 112, such as might otherwise result in unwanted deformation of the substrate 112.

As also noted above, movement of the flexure arms 104, 106, 108 can be caused by various stresses to the system including, for example, transient thermal gradients, thermal cycling, transient mechanical forces (e.g., vibrations), and transient changes in gravitational forces induced by changes in the overall orientation of the imaging system. Usefully, for the illustrated configuration, once the transient stresses have been removed, the flexures arms 104, 106, 108 resiliently and predictably return the substrate 112 (and the projection target 110) to a known, calibrated position.

In some embodiments, including as illustrated, the flexure arms 104, 106, 108 can be configured so that the expected transient stresses may result in a purely elastic deformation, such that the deformation remains in a linear portion of the relevant stress-strain curve and is correspondingly reversible. This can, for example, usefully allow predicable and consistent return of the substrate 112 (and the projection target 110) to a home position.

In some embodiments, the flexure arms 104, 106, 108 can also help to prevent unwanted deformation of the substrate 112, which could otherwise cause a deviation from an optical axis (e.g., a point within the plane). For example, in the embodiment illustrated, the elastic flexibility and selectively oriented constraints of the flexure arms 104, 106, 108 can allow for flexible and reversible absorption of transient stresses without deformation of the substrate 112 (e.g., via buckling out of the focal plane).

In some embodiments, other features can be provided. For example, as shown in FIG. 2 in particular, notches 104c, 106c, 108c in the flexure arms 104, 106, 108 can be configured as locating features for the substrate 112, as well as to provide further stability for the substrate 112 as attached to the flexure arms 104, 106, 108.

In the embodiment illustrated, the flexure arms 104, 106, 108 are used to secure the projection system 100. This configuration may be particularly useful, for example, due to the ability to maintain the projection target 110 within the optical plane of the lens arrangement 102, so that the projection system 100 can facilitate accurate measurements in two dimensions. In some embodiments, however, a similar flexure arrangement can be beneficially used to secure an imaging system. In some embodiments, including as illustrated, a similar flexure arrangement can be used to secure an imaging or projection system relative to a different larger optical system.

Figure 6:
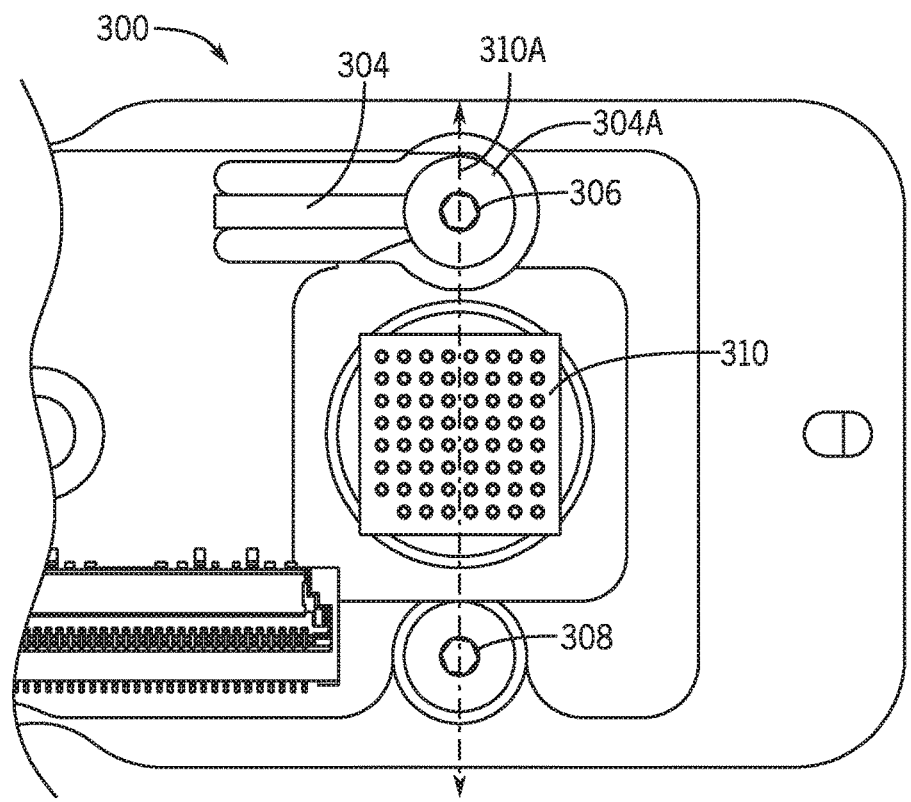
FIG. 6 shows an enlarged top plan partial view of an imaging system of the optical system of FIG. 1.

As also noted above, in some embodiments, a flexure arrangement can include a single flexure (e.g., a single flexure arm) and a fully fixed, non-flexure constraint. For example, as illustrated in FIG. 6 in particular, the imaging system 300 includes an imaging device configured as an imaging sensor 310 mounted to a PCB 312 (see FIG. 2), which is secured to the frame via a flexure arrangement that includes a single flexure arm 304 and a fixed constraint 308.

In different embodiments, the imaging system 300 can be configured in different ways. For example, imaging sensor 310 can be configured as a 2D grayscale camera affixed to the PCB 312 and configured to interoperate with the projection system 100 (see above) and a processor device (not shown) for 3D dimensioning operations. Generally, the imaging sensor 310 can be configured as a complementary metal-oxide semiconductor ("CMOS") device, a charge coupled device ("CCD"), or other known device to register electronic signals based on photon incidence.

In some embodiments, as also noted above, an optical system can include multiple imaging systems, such as the imaging systems 200, 300 of the optical system 50. In the illustrated embodiments, the imaging systems 200, 300 are similarly secured to the frame of the optical system 50, with a flexure arm 204 and a fixed constraint 208 (see FIG. 2) arranged to secure the imaging system 200 similarly to the flexure arm 304 and the fixed constraint 308 for the imaging system 300. Accordingly, discussion below relative to the flexure arm 304 and the fixed constraint 308 can generally also apply to the flexure arm 204 and the fixed constraint 208.

Also as noted above, however, other aspects of the imaging system 200 may vary from those of the imaging system 300. For example, the imaging system 200 can be configured as a color imaging system that is configured to capture details (e.g., texture) to overlay over 3D information determined using the projection system 100 and the imaging system 300. In other embodiments, other configurations are possible.

FIG. 6 illustrates an enlarged view of the third imaging system 300. As noted above, the imaging systems 200, 300 generally include similar components and generally function in a similar manner. Accordingly, similar considerations as discussed herein with regard to FIG. 6 may also apply to the imaging system 200 (see, e.g., FIG. 2).

As discussed above, the third imaging system 300 includes two mechanical links configured to secure the imaging sensor 310 (via the PCB 312 as shown in FIG. 2) to the frame of the optical system 50, with one link configured as a fixed constraint and one link configured as a flexure that includes the single flexure arm 304. In particular, in the embodiment illustrated, the fixed constraint 308 rigidly secures the PCB 312 to the optical beam 52 of the optical system 50 (e.g., via a counter-sunk screw), with essentially zero degrees of freedom of movement. In contrast, the flexure arm 304 is rigidly secured to the PCB 312 (e.g., also via a counter-sunk screw) in order to flexibly secure the PCB 312 to the frame of the optical system 50 to permit movement of the PCB 312 along at least one degree of freedom.

In the embodiment illustrated, the flexure arm 304 is integrally formed with the frame of the optical system 50, and extends along the imaging sensor 310 generally opposite the location of the fixed constraint 308. To secure the flexure arm 304 to the PCB 312, a free end 304a of the flexure arm 304 includes a connection device, opposite the connection of the flexure arm 304 to the frame. In the embodiment illustrated, the connection device of the flexure arm 304 is configured as a circular aperture to receive a threaded fastener 306 (e.g., a counter-sunk screw) to secure the PCB 312 to the flexure arm 304.

In the embodiment illustrated, the connection device of the flexure arm 304 (i.e., the circular aperture) is aligned with the fixed constraint 308 along a reference line 310a that extends across the imaging sensor 310 substantially perpendicularly to an elongate direction of the flexure arm 304 and substantially perpendicularly to the separation direction that extends between the imaging sensor 310 and the projection target 110. In some embodiments, the reference line 310a can coincide with a permitted movement dimension for the imaging sensor 310 (i.e., under the constraints of the flexure arm 304 and the fixed constraint). Further, the reference line 310a can be configured to remain in alignment with the optical axis 302a of the lens arrangement (see FIG. 1) throughout operational deformation of the flexure arm 304.

This arrangement may be useful, for example, as also discussed below, to allow the PCB 312 to reversibly deform substantially along only a single non-critical dimension. For example, as also noted above, the imaging system 300 is configured to operate in conjunction with the projection system 100 to support extraction of 3D information from a 2D image of an object, with 3D measurements being effectively performed, via epipolar triangulation, along two dimensions defined by the projection system 100 and one dimension defined by the imaging system 300. Notably, the critical measurement dimension of the imaging sensor 310 is substantially perpendicular to the reference line 310a, And a center point of the connection device of the single flexure arm 304 and a center of the fixed constraint 308 are generally aligned, along a common reference line, with the optical axis 302a of the lens arrangement 302 (see FIG. 1). Accordingly, the flexure arm 304 and the fixed constraint 308 are configured to allow movement and deformation of the imaging sensor 310 along a dimension that is not critical to 3D measurements (i.e., in parallel with the reference line 310a), while preventing movement and deformation of the imaging sensor 310 along a dimension that is critical to 3D measurements (i.e., perpendicular to the reference line 310a).

Thus, the illustrated arrangement can control deformation of the PCB 312 under transient stresses to proceed along a direction that results in minimal disruption to ongoing imaging and analysis. Further, similarly to the flexure arms 104, 106, 108, the flexure arm 304 may also generally restrict movement of the imaging sensor 310 out of the relevant focal plane. Correspondingly, a highly accurate and robust 3D measurement system can be obtained using the relatively low cost single-flexure arrangement illustrated in FIG. 6 (i.e., using the fixed constraint 308 and the single flexure arm 304).

In the embodiment illustrated, the fixed constraint 308 generally constrains movement relative to all degrees of freedom and correspondingly can provide a fixed reference point, as may be useful during calibration of the larger optical system 50. In contrast, the single flexure arm 304 individually restricts movement relative to certain respective degrees of freedom, while individually providing little resistance to other degrees of freedom (e.g., as described above) Accordingly, in some implementations, the fixed constraint 308 (or another point having fixed relationship thereto) can be defined during calibration as an "origin" coordinate in all relevant dimensions. Also during calibration, the flexure arm 304 may be known to be in a first calibrated orientation, which may correspond to a calibrated orientation of the PCB 312 and the imaging sensor 310. Machine vision (or other) operations can then be configured to execute based upon an assumption that the imaging sensor 310 is in the calibrated orientation.

Usefully, thereafter, as transient stresses are applied, the single flexure arm 304 may move (e.g., bend) relative to the noted one degree of freedom, within the plane defined by a surface of the imaging sensor 310. Accordingly, the flexure arm 304 and the fixed constraint 308 can permit the imaging sensor 310 to move predictably and repeatably within the focal plane of the lens arrangement 302, while movement out of the focal plane may be substantially prevented. Further, as also noted above, the movement of the imaging sensor 310 can be constrained to a dimension (e.g., vertically from the perspective of FIG. 6, along the line 310a) that may minimize disruption to image acquisition and processing. And, upon removal of the transient stresses, the flexure arm 304 can predictably return the imaging system 300 to the known, calibrated orientation.

Thus, through the use of a combination of relatively low cost, partially integrated flexure arrangements, the optical system 50 can provide for relatively high accuracy 3D measurement (or other optical operations), including by channeling deformation and displacement, under transient stresses, to proceed solely along favorable degrees of freedom. Accordingly, the optical system 50 and, in particular, the flexure and optical arrangements along the optical beam 52 can provide substantial improvements over conventional systems.

Figure 7:
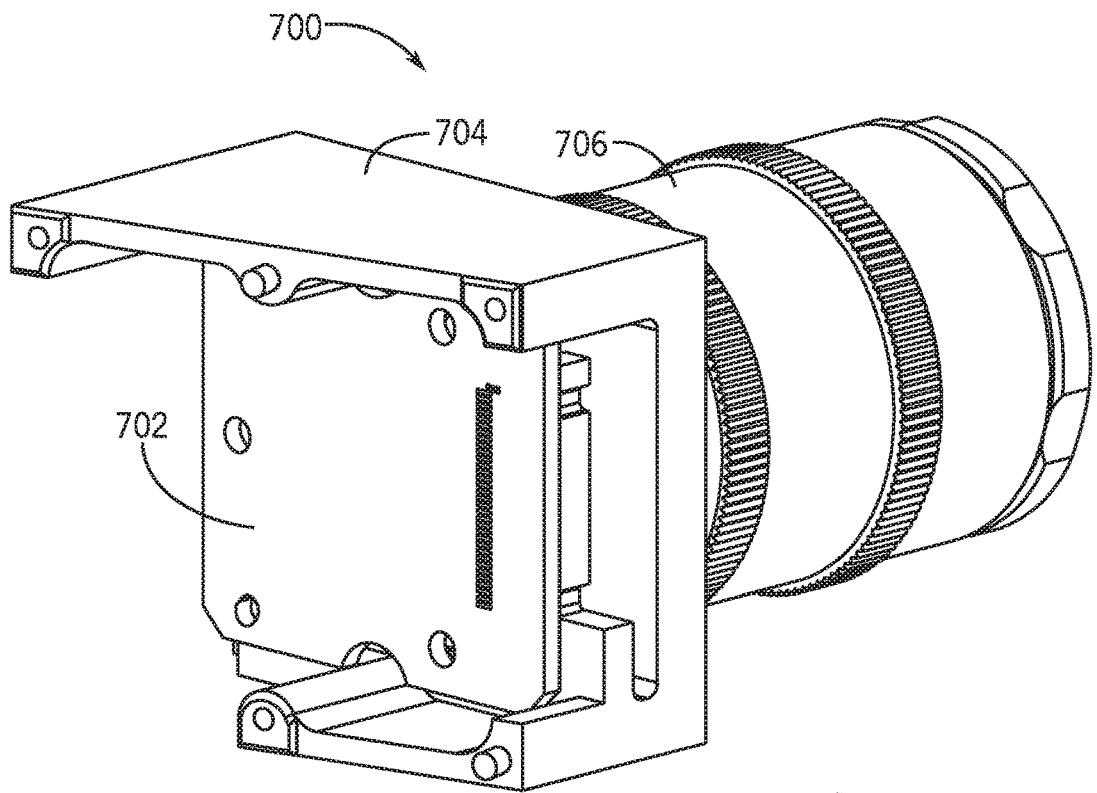
FIGS. 7 and 8 show isometric views of an optical system according to another embodiment of the technology, with certain components removed from view in FIG. 8.

FIG. 7 illustrates another optical system according to an embodiment of the technology, configured as an imager 700. In the embodiment illustrated, the imager 700 includes a PCB 702, a support structure 704, and a lens arrangement 706. Generally, the lens arrangement 706 can include one or more lenses configured to focus or disperse light, one or more shutters configured to efficiently capture an image of an imaging field, or other components, and can generally define an optical axis that is configured to intersect an imaging sensor 708 (see FIG. 8) that is affixed to a surface of the PCB 702. (e.g., via an adhesive or soldering).

The imaging sensor 708 can be configured as any appropriate sensor, such as a sensor of any of the types described above. In some embodiments, a similar arrangement can be employed for a projection system, such as may include a projection target similar to the projection target 110 (see, e.g., FIG. 5) in place of the PCB 702. In embodiments with a projection system, an illumination source may also be included.

Figure 8:
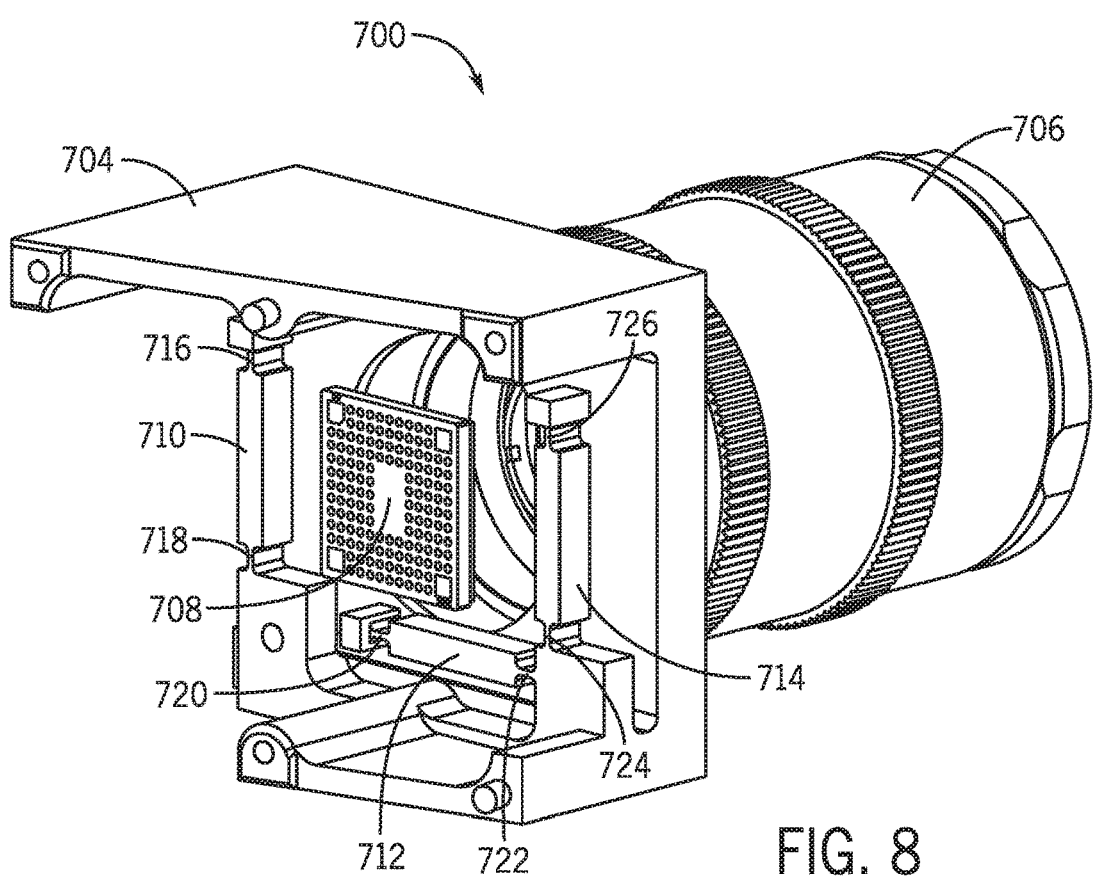

As illustrated in FIG. 8, for example, the support structure 704 includes three integrally formed flexure arms 710, 712, 714 which are arranged to support the PCB 702. The flexure arm 710 extends from a first portion of the support structure 704 in a first direction. The flexure arms 712, 714 extend from a shared anchor point at a second, common portion of the support structure 704, with the flexure arm 714 extending substantially in parallel with the flexure arm 710 and the flexure arm 712 extending substantially perpendicularly to both of the flexure arms 710, 714. The free ends of the flexure arms 710, 712, 714 can be secured to the PCB 702 in various ways, including via adhesive or fastener connections. In some embodiments, the free ends of flexure arms 710, 712, 714 can be rigidly and non-rotatably connected to the PCB 702 using adhesive, rather than threaded fasteners or other similar devices.

Figure 9:
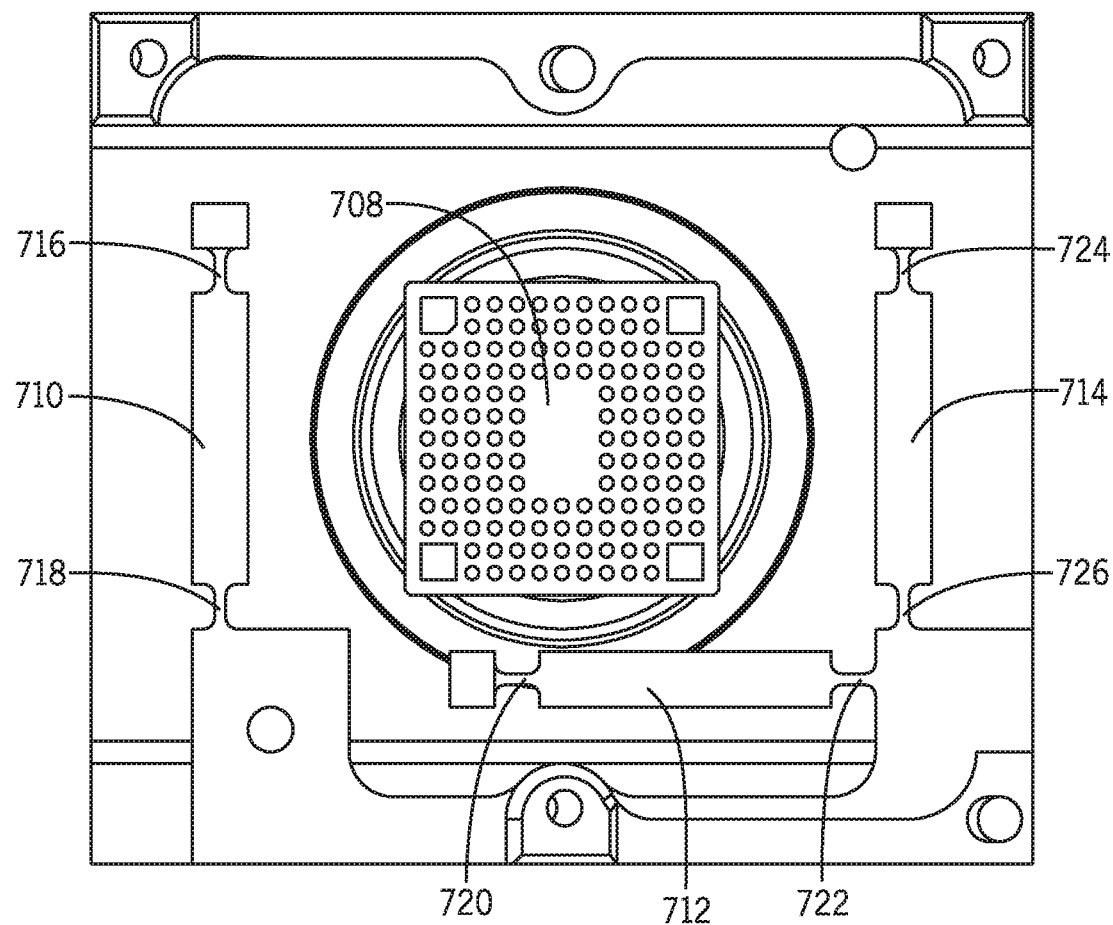
FIG. 9 shows a rear elevation view of the optical system of FIGS. 7 and 8, with certain components removed from view.

As illustrated in particular in FIG. 9, each of the flexure arms 710, 712, 714 exhibits certain portions of varying cross-section. For example, the flexure arm 710 includes an end neck portion 716 located near a free end of the flexure arm 710, and a base neck portion 718 that connects the flexure arm 710 to the first portion of the support structure 704. Each of the end neck portion 716 and the base neck portion 718 has a significantly decreased thickness compared to adjacent portions of the flexure arm 710 and, in the embodiment illustrated, the remainder of the flexure arm 710 in general. Similarly, the flexure arms 712, 714 include base neck portions 722, 726, respectively, located near the second portion of the support structure 704, and end neck portions 720, 724, respectively, located near free ends of the flexure arms 712, 714. As with the flexure arm 710, the neck portions 720, 722, 724, 726 of the flexure arms 712, 714 have a significantly decreased thickness compared to adjacent (and other) portions of the flexure arms 712, 714. As also discussed below, this configuration can provide a useful combination of flexibility and stiffness for the flexure arms 710, 712, 714 and the flexure arrangement generally.

In the embodiment illustrated, the neck portions 716 through 724 have substantially, equal thicknesses and shapes. For example, as illustrated in FIG. 9, a general "u" shape cutout can extend into each side of the relevant flexure arm 710, 712, 714 at each of the neck portions 716 through 724. In other embodiments, other configurations are possible.

Usefully, in the embodiment illustrated, the flexure arms 710, 712, 714 can individually constrain movement relative to certain respective degrees of freedom, while individually providing little resistance relative to other degrees of freedom. In this regard, for example, the flexure arms 710, 712, 714 can appropriately constrain the movement of the imaging sensor 708 (via the PCB 702), and ensure repeatable returns to a calibrated orientation, without significantly over-constraining the larger system.

For example, upon application of relevant stresses, the flexure arm 710 can bend at the end neck portion 716 and the base neck portion 718 within a plane defined by a surface on the optical sensor 708 (e.g., a focal plane of the lens arrangement 706). In particular, for the illustrated embodiment, the base neck portion 718 can bend to effectively allow translation of the optical sensor 708, due to the relatively small scale of the expected deformation. In contrast, the end neck portion 716 can bend to allow rotation of the optical sensor 708 relative to a rotational center at the neck portion 716. However, movement perpendicular to the relevant focal plane (e.g., into or out of the page in FIG. 9) is substantially constrained by the flexure arm 710, due to the relatively large thickness of the arm in that direction (see, e.g., FIG. 7). Likewise, movement in parallel with the elongate direction of the flexure arm 710 is also substantially constrained, as are other movements (including rotations) not noted above.

Being similarly configured to the flexure arm 710, the flexure arms 712, 714 can operate similarly to the flexure arm 710, but relative to their own respective degrees of freedom, as defined by the particular orientations of the flexure arms 712, 714 and the neck portions 720 through 726. Accordingly, in the embodiment illustrated, the flexure arms 710, 712, 714 can combine to generally allow predictable movement of the imaging sensor 708 (via the PCB 702) relative to six degrees of freedom, while generally maintaining the imaging sensor 708 in the appropriate optical (e.g., focal) plane.

As with other examples discussed herein, movement of the flexure arms 710, 712, 714 from a first calibrated position to a second loaded position can be generally caused by stresses to the system including from: transient thermal gradients, thermal cycling, transient mechanical vibrations, and changes in gravitational forces induced by transient shifting in the orientation of the imaging system. Once the stresses have been removed, the flexure arms 710, 712, 714 can resiliently, predictably, and repeatably return the imaging sensor 708 to a known, calibrated position.

As with other arrangements discussed herein, in some embodiment, particular configuration of the flexure arms 710, 712, 714 and the attachment of the PCB 702 thereto can be selected in order to provide additional benefits. For example, in some embodiments, the flexure arms 710, 712, 714 can be secured to the PCB 702 in order to substantially minimize motion of a center of the imaging sensor 708 relative to an optical axis of the lens arrangement 706.

In other embodiments, other configurations are possible. In some embodiments, for example, flexure arms similar to the flexure arms 710, 712, 714 can be integrally formed with a PCB (e.g., the PCB 702), rather than as part of a support structure for the PCB.

In some embodiments, flexure arrangements according to the principles herein can be used with other systems, including other optical metrology systems. For example, embodiments of the technology, including embodiments with a single flexure, can be used with laser triangulation systems, stereo imaging systems, and other systems in which it may be useful to limit deflection of a sensor (or other component) to a particular direction. In this regard, for example, single-flexure arrangements such as the arrangement illustrated in FIG. 6 can be rotated by 90 degrees (or otherwise) depending on the needs of a particular system.

Thus, embodiments of the technology can provide improved positioning systems for imaging and other components of optical systems. In some embodiments, for example, flexure arrangements can usefully constrain and permit movement relative to select degrees of freedom, in order to ensure that changes to a system under transient stresses are minimal and predictable, and to ensure that the system predictably and repeatably returns to a calibrated orientation once transient stresses are removed.

While the technology has been described with reference to example embodiments, it will be understood by those skilled in the art that various changes may be made and equivalents may be substituted for elements thereof without departing from the scope of the technology. In addition, many modifications will be appreciated by those skilled in the art to adapt a particular instrument, situation or material to the teachings of the technology without departing from the essential scope thereof. Therefore, it is intended that the technology not be limited to the particular embodiment disclosed as the best mode contemplated for carrying out this technology, but that the technology will include all embodiments falling within the scope of the appended claims.

What is claimed is:

1. A positioning system for a three-dimensional (3D) measurement system that includes a projection system with a projection target and a projector that defines a projector focal plane, and an imaging system with an imaging sensor and a lens arrangement that defines an imaging focal plane, the imaging system being configured to interoperate with the projection system to execute 3D measurements, the positioning system comprising:
  a support frame;
  a first flexure arrangement configured to secure the projection target relative to the support frame, the first flexure arrangement including a plurality of flexures that permit two-dimensional (2D) movement of the projection target within the projector focal plane and that prevent movement of the projection target out of the projector focal plane, in response to transient stresses on the 3D measurement system; and
  a second flexure arrangement, spaced apart from the first flexure arrangement along the support frame, the second flexure arrangement including a fixed constraint and a single flexure arm that direct movement of the imaging sensor substantially along a single movement dimension within the imaging focal plane and that prevent movement of the imaging sensor out of the imaging focal plane, in response to transient stresses on the 3D measurement system, wherein one or more of the flexures of the first flexure arrangement are rigidly and non-rotatably secured to a glass substrate of the projection target.

2. The positioning system of claim 1, wherein at least one of the first flexure arrangement or the single flexure arm is integrally formed with the support frame.

3. The positioning system of claim 1, with the imaging system being spaced apart from the projection target in a first direction and with optical axes of the projection system and the imaging system being obliquely oriented relative to each other, wherein the single movement dimension is substantially perpendicular to the first direction.

4. The positioning system of claim 1, wherein the one or more of the flexures are secured to the projection target with adhesive.

5. The positioning system of claim 1, wherein the imaging sensor is secured with threaded fasteners to the single flexure arm and at the fixed constraint.

6. The positioning system of claim 1, with the imaging system defining an optical axis, wherein a reference line, between the fixed constraint and an attachment point of the single flexure arm to the imaging sensor, passes through the optical axis.

7. The positioning system of claim 6, wherein the reference line coincides with the single movement dimension.

8. The positioning system of claim 1, wherein the first flexure arrangement includes:
 a first flexure arm of the first flexure arrangement that extends from the support frame in a first direction; and
 a second flexure arm of the first flexure arrangement that extends from the support frame in a second direction that is substantially perpendicular to the first direction.

9. The positioning system of claim 8, wherein a third flexure arm of the first flexure arrangement extends from the support frame in the second direction, the third flexure arm being spaced apart from the second flexure arm in the first direction.

10. The positioning system of claim 9, wherein the first flexure arm extends from a first portion of the support frame; and
 wherein the second and third flexure arms extend from a second portion of the support frame that extends substantially perpendicularly to the first portion of the support frame.

11. The positioning system of claim 1, wherein each of the flexures of the first flexure arrangement includes a notch that provides a locating feature for the projection target.

12. The positioning system of claim 1, with the projection system defining an optical axis, wherein each of at least two flexure arms of the plurality of flexures of the first flexure arrangement is secured to the projection target at a respective attachment point;
 wherein each of the attachment points is disposed on a first reference line that extends perpendicularly to the optical axis within the projector focal plane; and
 wherein an additional flexure arm included in the plurality of flexures of the first flexure arrangement is secured to the projection target at an attachment point that is disposed on a second reference line that is substantially perpendicular to the first reference line and extends through the optical axis within the projector focal plane.

13. The positioning system of claim 12, wherein at least one of the first reference line or the second reference line is a centerline of the projection target.

14. The positioning system of claim 1, with the imaging system being a first imaging system, and with the 3D measurement system further including a second imaging system with a second imaging sensor and a second lens arrangement that defines a second imaging focal plane, the positioning system further comprising:
 a third flexure arrangement, disposed between the first and second flexure arrangements along the support frame;
 wherein the third flexure arrangement includes a second fixed constraint and a second single flexure arm that direct movement of the second imaging sensor substantially along a second single movement dimension within the imaging focal plane and that prevent movement of the second imaging sensor out of the second imaging focal plane, in response to transient stresses on the 3D measurement system.

15. A positioning system for a three-dimensional (3D) measurement system that includes a projection system with a projection target and a projector that defines a projector focal plane, and an imaging system with an imaging sensor and a lens arrangement that defines an imaging focal plane, the imaging system being configured to interoperate with the projection system to execute 3D measurements, the positioning system comprising:
 a support frame;
 a first flexure arrangement configured to secure the projection target relative to the support frame, the first flexure arrangement including a plurality of flexures that permit two-dimensional (2D) movement of the projection target within the projector focal plane and that prevent movement of the projection target out of the projector focal plane, in response to transient stresses on the 3D measurement system, wherein the first flexure arrangement includes:
  a first flexure arm of the first flexure arrangement that extends from the support frame in a first direction, the first flexure arm extending from a first portion of the support frame;
  a second flexure arm of the first flexure arrangement that extends from the support frame in a second direction that is substantially perpendicular to the first direction; and
  a third flexure arm extending from the support frame in the second direction, the third flexure arm being spaced apart from the second flexure arm in the first direction, the second and third flexure arms extending from a second portion of the support frame that extends substantially perpendicularly to the first portion of the support frame; and
 a second flexure arrangement, spaced apart from the first flexure arrangement along the support frame, the second flexure arrangement including a fixed constraint and a single flexure arm that direct movement of the imaging sensor substantially along a single movement dimension within the imaging focal plane and that prevent movement of the imaging sensor out of the imaging focal plane, in response to transient stresses on the 3D measurement system.

16. The positioning system of claim 15, wherein one or more of the first, second, or third flexures are rigidly and non-rotatably secured to a substrate of the projection target.

17. The positioning system of claim 16, with the projection system defining an optical axis, wherein each of at least two flexure arms of the plurality of flexures of the first flexure arrangement is secured to the projection target at a respective attachment point;

wherein each of the attachment points is disposed on a first reference line that extends perpendicularly to the optical axis within the projector focal plane; and wherein an additional flexure arm included in the plurality of flexures of the first flexure arrangement is secured to the projection target at an attachment point that is disposed on a second reference line that is substantially perpendicular to the first reference line and extends through the optical axis within the projector focal plane.

18. A positioning system for a three-dimensional (3D) measurement system that includes a projection system that defines an optical axis and includes a projection target and a projector that defines a projector focal plane, and an imaging system with an imaging sensor and a lens arrangement that defines an imaging focal plane, the imaging system being configured to interoperate with the projection system to execute 3D measurements, the positioning system comprising:

a support frame;

a first flexure arrangement configured to secure the projection target relative to the support frame, the first flexure arrangement including a plurality of flexures that permit two-dimensional (2D) movement of the projection target within the projector focal plane and that prevent movement of the projection target out of the projector focal plane, in response to transient stresses on the 3D measurement system, wherein each of at least two flexure arms of the plurality of flexures of the first flexure arrangement is secured to the projection target at a respective attachment point, wherein each of the attachment points is disposed on a first reference line that extends perpendicularly to the optical axis within the projector focal plane, and wherein an additional flexure arm included in the plurality of flexures of the first flexure arrangement is secured to the projection target at an attachment point that is disposed on a second reference line that is substantially perpendicular to the first reference line and extends through the optical axis within the projector focal plane; and a second flexure arrangement, spaced apart from the first flexure arrangement along the support frame, the second flexure arrangement including a fixed constraint and a single flexure arm that direct movement of the imaging sensor substantially along a single movement dimension within the imaging focal plane and that prevent movement of the imaging sensor out of the imaging focal plane, in response to transient stresses on the 3D measurement system.

19. The positioning system of claim 18, wherein at least one of the first reference line or the second reference line is a centerline of the projection target.

20. The positioning system of claim 18, wherein each of the at least two flexure arms of the plurality of flexures of the first flexure arrangement is rigidly and non-rotatably secured to a substrate of the projection target at the respective attachment point.

* * * * *